(12) United States Patent
Karidis et al.

(10) Patent No.: US 10,671,134 B2
(45) Date of Patent: Jun. 2, 2020

(54) MEMORY MODULES WITH SECONDARY, INDEPENDENTLY POWERED NETWORK ACCESS PATH

(71) Applicant: International Business Machines Corporation, Armonk, NY (US)

(72) Inventors: John Karidis, Ossining, NY (US); Luis Lastras-Montano, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 15/867,356

(22) Filed: Jan. 10, 2018

(65) Prior Publication Data

US 2019/0212797 A1 Jul. 11, 2019

(51) Int. Cl.
*G06F 1/00* (2006.01)
*G06F 1/26* (2006.01)
(Continued)

(52) U.S. Cl.
CPC .............. *G06F 1/266* (2013.01); *G06F 1/263* (2013.01); *G06F 1/28* (2013.01); *G06F 1/305* (2013.01);
(Continued)

(58) Field of Classification Search
CPC . G06F 1/266; G06F 1/263; G06F 1/28; G06F 1/305; G06F 13/385;
(Continued)

(56) References Cited

U.S. PATENT DOCUMENTS

| | | | |
|---|---|---|---|
| 7,484,109 B2* | 1/2009 | Feldman | G06F 1/28 713/300 |
| 7,941,677 B2* | 5/2011 | Penning | G06F 1/263 361/731 |
| 8,140,604 B2 | 3/2012 | Ingen et al. | |
| 8,230,257 B2 | 7/2012 | Wilson | |
| 8,250,310 B2 | 8/2012 | Cook | |
| 9,213,485 B1* | 12/2015 | Hayes | H04L 49/10 |

(Continued)

FOREIGN PATENT DOCUMENTS

| | | |
|---|---|---|
| TW | 200632655 | 9/2006 |
| WO | WO 2009084791 A1 | 7/2009 |
| WO | WO 2015116100 A1 | 8/2015 |

OTHER PUBLICATIONS

Halderman et al., "Lest We Remember: Cold Boot Attacks on Encryption Keys", USENIX Association 17th USENIX Security Symposium, Jul. 28-Aug. 1, 2008, San Jose, CA, pp. 45-60.

*Primary Examiner* — Aurel Prifti
(74) *Attorney, Agent, or Firm* — Scully, Scott, Murphy & Presser, P.C.; Daniel Morris, Esq.

(57) ABSTRACT

A persistent memory storage system and method of operating. The storage system is embodied as memory module (e.g., a DIMM or PCIe card) in a host server and accessible via a first access path to/from the memory module. After a power failure at the host server, any authorized device, e.g., a second server, is configured to access and extract the retained memory at the failed host server via a secondary network-based access path (e.g., Ethernet connection). Power may be supplied to the memory module of the failed host server via a Power-over-Ethernet switch to support the secondary access path. A Power-over-Ethernet (PoE) switch may provide the necessary power to the memory module when power is unavailable from the host server and when any temporary power source is exhausted. A redundant power source and/or backup battery may supply the PoE switch. Such power sources and/or batteries can thereby provide backup power.

18 Claims, 6 Drawing Sheets

(51) Int. Cl.
*G06F 13/38* (2006.01)
*G06F 1/28* (2006.01)
*G06F 13/42* (2006.01)
*G06F 1/30* (2006.01)
*G06F 11/00* (2006.01)

(52) U.S. Cl.
CPC ............ *G06F 11/00* (2013.01); *G06F 13/385* (2013.01); *G06F 13/4282* (2013.01); *G06F 2213/0026* (2013.01); *G06F 2213/0032* (2013.01); *G06F 2213/0042* (2013.01)

(58) Field of Classification Search
CPC ......... G06F 13/4282; G06F 2213/0026; G06F 2213/0032; G06F 2213/0042
See application file for complete search history.

(56) References Cited

U.S. PATENT DOCUMENTS

| | | | |
|---|---|---|---|
| 9,256,263 B1* | 2/2016 | Narayanan | G06F 1/30 |
| 9,703,636 B2* | 7/2017 | Lucas | G06F 11/1433 |
| 2006/0080515 A1* | 4/2006 | Spiers | G06F 11/1441 |
| | | | 711/162 |
| 2010/0332863 A1* | 12/2010 | Johnston | G06F 1/26 |
| | | | 713/300 |
| 2014/0052306 A1 | 2/2014 | Motobayashi | |
| 2016/0364347 A1* | 12/2016 | Yeung | G06F 13/1673 |
| 2017/0199692 A1* | 7/2017 | Nguyen | G06F 1/30 |
| 2017/0249248 A1* | 8/2017 | Nguyen | G06F 3/06 |
| 2018/0024964 A1* | 1/2018 | Mao | G06F 3/0655 |
| | | | 711/173 |
| 2018/0260135 A1* | 9/2018 | Hayashida | G06F 13/4282 |
| 2019/0036893 A1* | 1/2019 | Jiang | H04L 63/0485 |

* cited by examiner

MEMORY MODULES WITH SECONDARY, INDEPENDENTLY POWERED NETWORK ACCESS PATH

FIELD

Embodiments of the present invention generally relate to retained memory and persistent memory storage systems, and particularly, to computer-implemented system and method to provide network-based access (e.g., Ethernet) to/from a back-up memory module of a first host system so that a second device, e.g., a server, would be able to access the retained memory.

BACKGROUND

It has become increasing necessary to provide effective systems for preserving data of persistent, e.g. volatile, memory storage systems in the face of adverse circumstances.

While Dynamic Random Access Memory (DRAM) embodied as a dual in-line memory modules (DIMMs) or peripheral component interconnect express (PCIe) cards include a series of dynamic random-access memory integrated circuits, a DRAM controller, they are usually equipped with a back-up power storage device, e.g., a battery or a supercapacitor.

It is the case that a supercapacitor or battery may not have sufficient power capacity to back-up high density DRAM.

Moreover, while DIMMs are built primarily to withstand power failures, however, it is the case that data is not saved if a computing device within which they are functioning fails unexpectedly.

Further, while Flash-backed DRAM (or other persistent memory modules) can retain data after a power failure, that data is currently inaccessible to any other device while a host server is inactive. This prevents rapid resumption of services and could "strand" the data for a very long time.

Moreover, persistent memory modules, e.g., flash-backed DIMMs or PCIe cards containing flash or phase-change memory, normally provide access to data only through a single interface. The persistent data can become unavailable if the hosting server has a significant problem.

SUMMARY

A persistent memory system, e.g., embodied in a memory chip, device or module, associated with a host computing system and accessible via a first access path comprises: a secondary access path through which the retained data could be extracted by a second computing system, and including provision of power to support the secondary access path.

A persistent memory system, e.g., embodied in a memory chip, device or module, in a host server and accessible via a first access path comprises: network-based access (e.g., Ethernet) to/from the memory module, e.g., a DIMM or PCIe card) so that any authorized device, e.g., a second server, would be able to access the retained memory. Access would normally be needed only after a power failure, but it is also possible to provide access during normal operation.

According to one aspect, there is provided a persistent memory storage system. The persistent memory storage system comprises: at least one memory storage device at a first computing system; a memory controller for controlling input data and output data operations to and from the at least one memory storage device; a network interface device operatively connected with the memory controller for communicating messages over a communications network; and a system for supplying power to the at least one memory storage device, the memory controller, and the network interface device upon detecting a power failure at the first computing system, wherein upon the power failure of the first computing system, the network interface device enabling a second computing system to access and extract data from the at least one memory storage device over a communications network.

In a further aspect, there is provided a persistent memory storage system comprising: at least one memory storage device at a first computing system, a memory controller for controlling input data and output data operations to and from the at least one memory storage device; a serial data interface connection associated with the at least one memory storage device, the serial data interface connection configured for supplying power to the at least one memory storage device upon detecting a power failure at the first computing system, the serial data interface physically connecting a second computer system and allowing access by the second computing system and extraction of data from the at least one memory storage device by the second computing system.

According to a further embodiment, there is provided a method of operating a persistent memory system. The method comprises: detecting, at a second computing system, a power failure at a first computing system, the first computing system, the first computing system comprising: at least one memory storage device at a first computing system; a memory controller for controlling input data and output data operations to and from the at least one memory storage device; and a network interface device associated with the memory storage device for communicating messages over a communications network; the first computer system receiving power from a back-up power supply source over a connection to a port of a Power-over-Ethernet switch for powering the at least one memory storage device, the memory controller, and the network interface device; determining, at the second computing system, a network address location of the network interface device associated with the memory storage device of the first computing system; and extracting, by the second computing system, data stored at the at least one memory storage device of the first computing system; messages for receipt at the network interface device over a communications network via the PoE connection.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
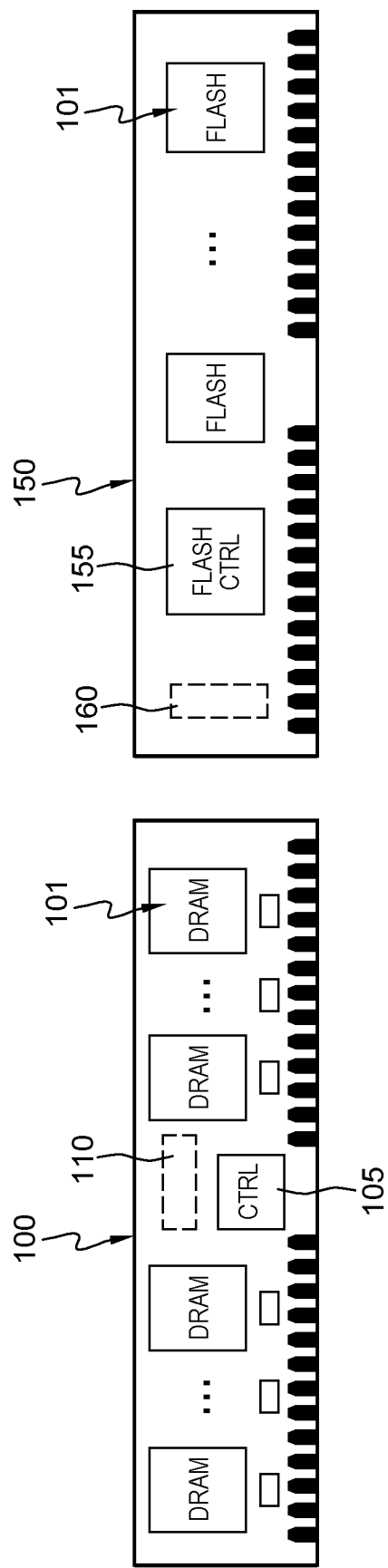
FIG. 1 depicts an example DRAM and Flash-based DRAM volatile memory system configured as a DIMM.

FIG. 1 shows examples of Dynamic Random Access Memory (DRAM) and Flash-based DRAM volatile memory system. The DRAM system is embodied as DIMM 100 or a peripheral component interconnect express (PCIe) card, and includes a series of dynamic random-access memory integrated circuits 101, a controller 105 for the DRAM, and an optional back-up power storage device, e.g., a battery or super capacitor 110. In a "Flash-backed" memory system, a DIMM 150 may further include a back-up flash type DRAM memory storage system that further include a series of flash memory storage integrated circuits 151, a controller 155 for the Flash, and the optional back-up power storage device 160, e.g., a super capacitor or battery 160.

Figure 2:
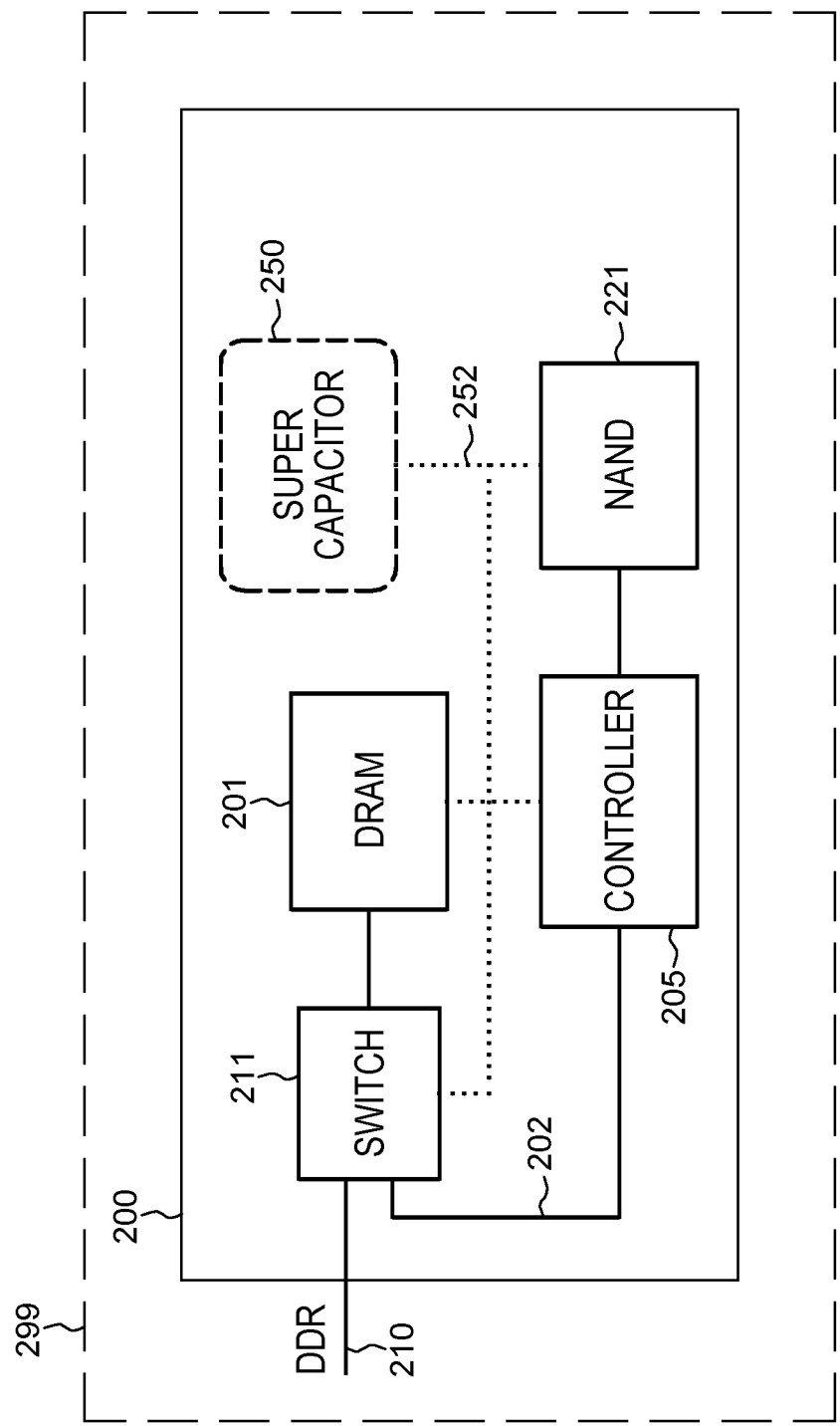
FIG. 2 depicts a conventional DRAM/Flash-backed memory storage DIMM as back up storage in a host computer.

As shown in FIG. 2, a typical DRAM/Flash-backed memory storage DIMM 200 includes: a dynamic random-access memory integrated circuits (DRAM Integrated circuit (IC) 201, an internal data bus 202, bus switches 211, a backup NAND Flash memory 221, a central processing unit (CPU) or controller 205 for the DIMM Flash and DRAM memories that communicates with its host device or server, and the alternative power source to the DIMM 200 in case of power loss including, for example, an optional battery or a super capacitor 250.

In operation, the DRAM 201 receives data, e.g., double data rate (DDR) data 210 from a source (e.g., in the host server) and stores in one or more DRAM ICs 201. Upon occurrence of a power failure to a DIMM, the controller initiates bus switch 211 to switch to the alternative power source 250 and initiate backup of the DRAM contents 201 into the Flash 221. Bus 202 accepts commands to manage the Flash memory and DRAM (e.g., for restoring the backed up memory). The DRAM/Flash-back memory DIMM 200 provides DRAM speed performance and behaves as pseudo-nonvolatile memory for advantageous employment in the host server storage system 299.

In an example memory store operation, on loss of external power to the DIMM, an existing power supply may send a non-maskable interrupt to the CPU 205 and the switch 211 is physically effected to initiate operation to the super capacitor 250 to supply the power to each of the DIMM elements, e.g., over a power bus 252. In one embodiment, the DIMM may be put into a self-refresh mode and the controller stops sending commands to ensure that the memory bus 202 is inactive. The DIMM controller 205, in either event (upon sensing the power loss condition or when being placed in the self-refresh mode), or upon receiving the separate interrupt signal, switches the DRAM pins from the DIMM connectors over to the controller pins and the on-DIMM controller 205 copies the DRAM contents over bus 202 into the Flash memory 221 all the while under the power from super capacitor(s) 250.

Data is normally recovered by the local CPU and placed from flash back to the DRAM after power is restored.

Figure 3:
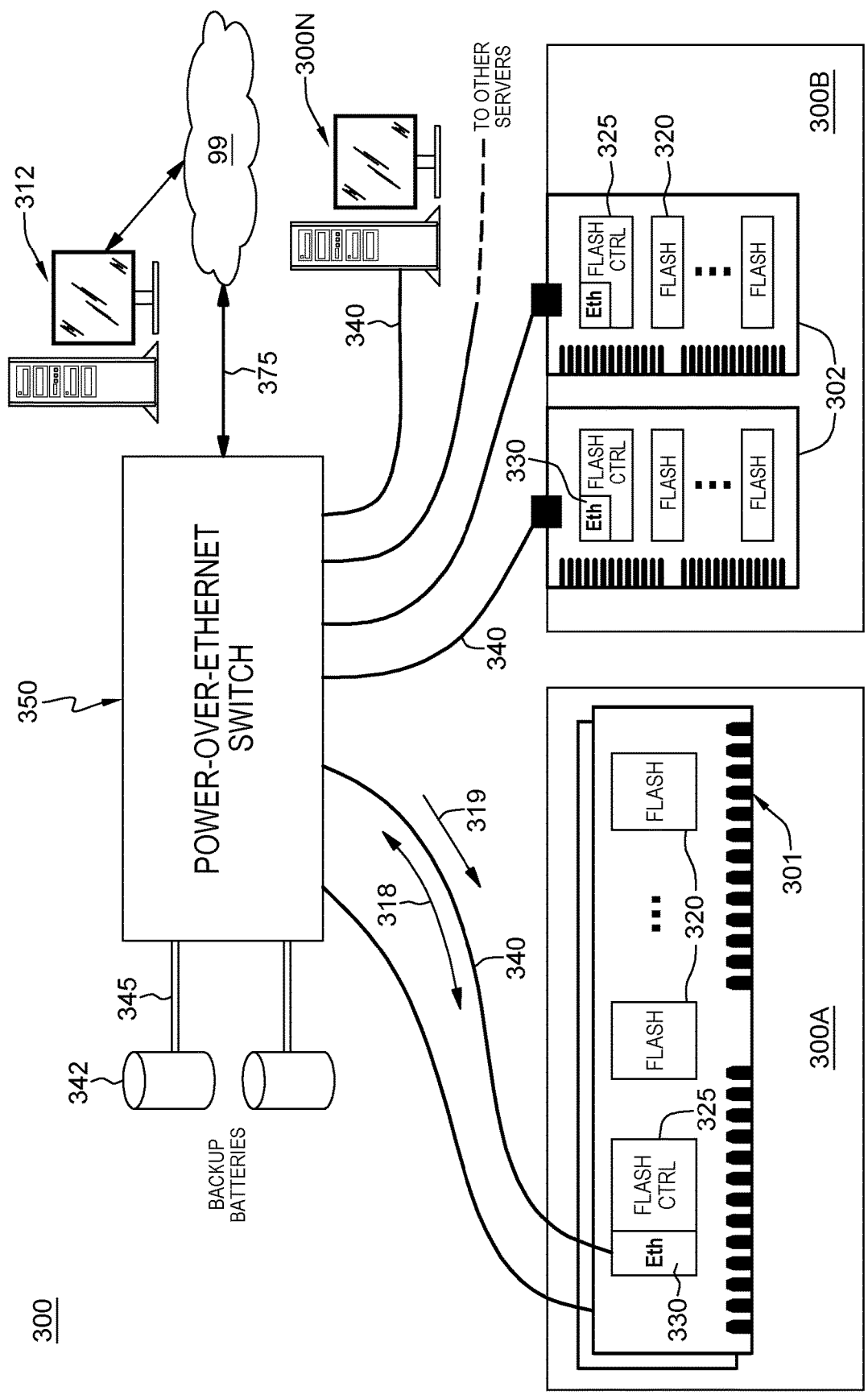
FIG. 3 depicts a networked memory access system that provides a secondary data path to/from a memory module, and provides backup power to the memory modules via a Power-over-Ethernet switch.

FIG. 3 depicts a networked memory access system 300 that provides a secondary data path to/from a memory module, and provides backup power to the memory modules via a Power-over-Ethernet switch 350.

As shown in FIG. 3, the networked memory access system includes a first host computing device, e.g., a server 300A, including one or more persistent memory modules such as DIMMs 301 with each DIMM card 301 including plural attached integrated circuit memory storage devices such as solid-state flash memory storage devices 320. Flash memory devices 320 may include NOR, NAND, vertical NAND, and floating gate flash memory device varieties that, in an exemplary embodiment, stores data backed up from other memory devices of the host system. The backing up of data is as known in art as described herein with respect to FIG. 2. A flash memory controller 325 is provided for managing the flash memory storage and flash memory file system directory and for communicating with its host device or server 300A.

FIG. 3 further depicts a second host computing device, e.g., a server 300B, including one or more persistent memory modules of a Peripheral Component Interconnect Express (PCIe) form factor 302. Each PCIe card 302 also includes plural attached integrated circuit memory storage devices such as solid-state flash memory storage devices 320. A flash memory controller 325 is provided for managing the flash memory storage and flash memory file system directory and for communicating with its host device or server 300B.

In one embodiment, each DIMM card 301 or PCIe card 302 may further include a communications network interface such as a network interface controller (NIC) device or chip 330. Such a device 330 provides, for the DIMM 301 or PCIe 302, an Ethernet connection adapted for typical network-based communications 318. In one embodiment, Ethernet (Internet Protocol) signals from the host servers 300A, 300B, ..., 300N may be communicated to/from another network connected device, e.g., switch, router, hub, or a computing device 312 over a communication network 99 (e.g., a local area network (LAN), or the Internet) via the PoE switch 350 over a physical (i.e., wired) communications network connection 375. In some embodiments, it is assumed power for such network communications is initially available at the hosting server.

In one embodiment, each NIC 330 is configured to provide an Ethernet connection adapted for network-based communication with another network-based device via the remote multi-port PoE switch 350. For providing such data communications functions, in one embodiment, each network interface card 330 is configured to receive electrical power 319 via a physical Power-over-Ethernet (PoE) connection 340, e.g., an Ethernet cable, that connects to an Ethernet interface, e.g., 10 BASE-T/100 BASE-TX port (i.e., 10/100 Mbps Power over Ethernet Port) for powering the DIMM 301 or PCIe card 302. The power 319 received from the PoE may be distributed to each of the components on the DIMM over an existing power bus (such as shown in FIG. 2) for use in powering the NIC, the memory controller 325 and flash memory components 320 thereon and rendering them operable. In one embodiment, connection 340 is a physical cabling that carries power and data signals to/from one or more of the multiple host servers 300A, 300B via the PoE multi-port switch 350.

In particular, the Power-over-Ethernet (PoE) switch 350 provides the necessary power directly to the DIMM (memory module) 301 when power is unavailable from the respective host server and when any (optional) temporary power source at the DIMM or PCIe card is exhausted (i.e., the supercapacitors or small batteries). As known, the physical PoE specification standardized in Institute of Electrical and Electronics Engineers (IEEE) as IEEE 802.3 standard incorporated herein by reference. The PoE IEEE 802.3 standard describes an Ethernet (network) cable and connector for supplying DC power along with Ethernet data and ensures that a device that already has an Ethernet connection can be powered in the absence of any other alternate power source. In one embodiment, the back-up batteries 342 may be used as the energy source that powers the DIMM through the PoE to provide additional protection. In one embodiment, the PoE switch may be backed-up by an uninterruptible power supply, and may controlled to easily disable or reset devices.

In one embodiment, the Ethernet cabling 340 is a 4 wire pairs (8 wires), e.g., twisted pair cabling, or fiber optic and carry signals, e.g., at up or exceeding 40 GB/sec frequency, to provide the required communication and electrical power to a variety of devices. In one embodiment, Power over Ethernet is injected onto the cable 340 at a voltage ranging between 44 and 57 volts DC, and typically 48 volts. The maximum amount of power IEEE 802.3af (PoE) that can be conveyed is dependent on the IEEE 802.3 (PoE) standards and can change as standards change.

While embodiments shown in FIG. 3 show a separate NIC chip 330, in an alternative embodiment, a memory buffer chip (not shown) provided in the DIMM for the purposes of managing the various DRAM devices in the DIMM may be the host of a NIC. Physically the PoE cable 340 would connect, i.e., plug into, a connector that is electrically connected to either the separate or integrated NIC.

The multi-port PoE switch 350 may further communicate Ethernet/IP protocol signals 318 from the host servers 300A, 300B, . . . , 300N to/from each other over cabling 340 via the multi-port switch 350.

As further shown in FIG. 3, the remote PoE switch device 350 is connected with a redundant, i.e., backup, power source, e.g., batteries 342 via respective physical connections 345 that provide backup power to the PoE switch 350. In one aspect, the redundant power sources and/or backup batteries 342 supplies power to the PoE switch for providing backup power to multiple persistent memory modules 301 through the multiport switch 350. In one embodiment, the PoE switch 350 receives electric power, e.g., direct current (DC) 319, and distributes the received power to provide a backup power source for one or more host devices 300A, 300B, . . . , 300N. In the embodiments shown, via a respective physical Power-over-Ethernet (PoE) connection 340, the PoE switch 350 distributes power to each of the DIMMs 301 of each connected host device, e.g., server devices 300A, 300B, . . . , 300N.

The networked memory access system 300 of FIG. 3 provides network-based access (e.g., Ethernet) to/from the memory module, e.g., the DIMM 301 (or PCIe card) so that any authorized server devices 300A, 300B, . . . , 300N is able to access the retained memory in another device. Particularly, the system 300 enables a server, e.g., 300B, to extract information from DIMMs of server 300A, in the event of a server failure, and vice versa—a server, e.g., 300A, may extract information from PCIe cards of server 300B, in the event of a server failure. In such embodiments, the DIMM or PCIe card flash controller 325 may control the rate at which data is extracted from a flash memory of the DIMM, e.g., have information extracted at a lower (reduced) rate so that the extraction fits within the power envelope provided by the PoE.

Access would be needed only after a power failure. In alternative embodiment, it is possible to provide access during normal operation.

Figure 4:
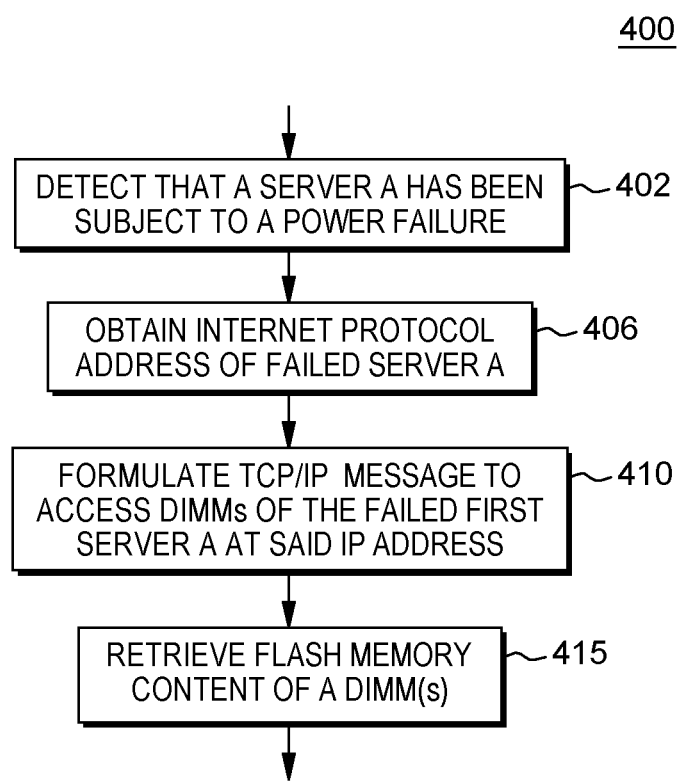
FIG. 4 depicts a method employed at a first server for accessing and extracting memory stored in a DIMM or PCIe card of a second server.

FIG. 4 depicts a method 400 employed at a first server for accessing and extracting memory stored in a DIMM or PCIe card of a second server. In an illustrative example, it is assumed that the server, e.g., server A has been subject to a power failure, and consequently has its DIMMs being powered by the back-up power source provided via PoE switch over the connected cable 340. At 402, a second (back-up) server, e.g., server B, or an external server 321, may detect that the first server has lost its power. For example, the second server may send a polling or like signal to the first server periodically and receive a corresponding responsive "ping" message, or otherwise attempt to contact the primary server over the network. If that polling or contacting fails, the second server recognizes the need to access DIMMs of the failed first server, e.g., server A, via a network-based message of a known communications protocol, e.g., TCP/IP. It is understood that a DIMM of the failed server, e.g., server A, has the capability of determining when a main power source for the server is no longer present, e.g., through a very simple voltage detection circuit (not shown). Using backup power via the PoA, the server A may alternately notify the second server, e.g., server B, at 402 to perform the backup of its flash memory contents.

Then, at 406, a second server may obtain the IP address on a standard networking stack that has been prior associated with the failed server A. Then, at 410, the DIMM of Server A that is connected to a PoE switch can be accessed via the TCP/IP network protocol by the second server B or an external server 321. FIG. 4, at 415, depicts the retrieval of memory content stored in the accessed DIMM the second or external server. Here, the Flash Controller element 325 of server A functions as the conduit for providing the memory data stored in the Flash memory chips 320 to the NIC interface 330 for communication to the second (back-up) server. In this embodiment, the failed server that has been setup with an IP address on a standard networking stack effectively functions as a (micro) server that is accessed by the second server as a client using standard TCP/IP access techniques.

Figure 5:
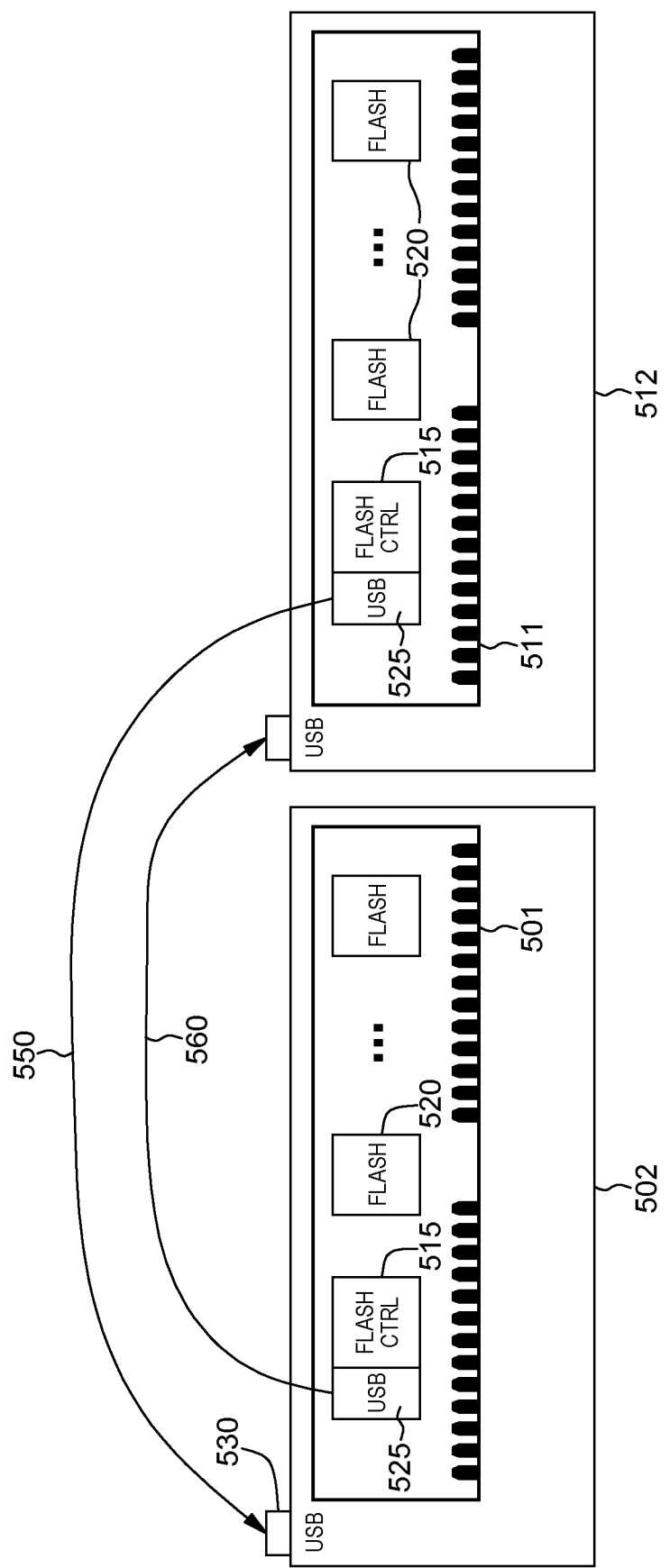
FIG. 5 depicts a system for extracting contents of a memory DIMM creating a serial back-door data connection or data access path using a universal serial bus (USB) interface.

In a further embodiment, FIG. 5 depicts a system 500 for extracting contents of a memory DIMM by creating a direct serial "back-door" data connection or path using a universal serial bus (USB) interface. In the embodiment depicted in FIG. 5, a first server 502 may access stored backup memory content of a DIMM 511 of a failed server, e.g., server 512 which may have backed memory content stored in DIMMS. In this embodiment, a Flash controller device 515 of the server, e.g., server 512, is provided with a serial bus interface device, e.g., a USB port 525. Via a hardwired connection, e.g., cabling 550, a second or backup server 502 may access contents of the flash-backed DIMM 511 of the first server 512 via a USB port 530 of the server 502. In this embodiment, data is routed to a first server via a back-door channel 550 from a second proximate or neighboring server. In this embodiment, the Flash Controller element 515 of server 512 functions as the conduit for providing the memory data stored in the Flash memory chips 520 to the USB interface 525 for communication to the second (back-up) server via its USB port 530. In the same manner, as shown in FIG. 5, the first server 512 may access contents of a flash-backed DIMM 501 of the second server 502 via a USB port 540 of the server 502 over cabling 560.

Thus, if a primary server dies (but the data still made it to the DIMM), a neighboring server may access the contents out of the Flash-backed DIMMs via a USB (or SATA) access medium instead of PoE, as the USB does have a powered mode, e.g., about 5.0 V.

Alternatively, via similar system configuration shown in FIG. 5, a serial advanced technology attachment (SATA) interface may be used to access data contents to/from the Flash controller on the Flash-backed DIMM of a neighboring server.

The difference with respect to the system configuration 400 of FIG. 4, is that the USB/SATA interface connection is a point-to-point communication mechanism (as opposed to networked devices). In such an embodiment, through the back-door path, contents of back-up flash regions may be directly copied into DRAM and vice versa, e.g., a Flash in a first server may be used as a small solid state drive for a second server, and vice-versa, through the back-door path.

In a further alternate embodiment, it may be determined that there may be multiple DIMMs or PCIe cards for a point-to-point connection to a central router or switch 350. In such an embodiment, the systems of FIG. 3 or 5 may be augmented by forming a local network 99 that may distribute power and relay data from a single designated device, e.g., computing device 312. In this embodiment, the power over Ethernet switch may have a power source that is not necessarily a backup battery.

In this embodiment, there may be multiple servers that are accessed and the system 300 may be configured to provide for a central (alternate) power source which may then to connect all the DIMMs of those servers through a respective PoE connection. Then that central power source becomes the place where information transfer to/from those DIMMs takes place, thereby becoming a centralized communications point. This centralized communications point can then access and perform as a relay to transmit information from those servers to other devices where it is needed. The centralized communications point may temporarily store the retrieved data from the multiple servers before relaying them to another server(s).

Figure 6:
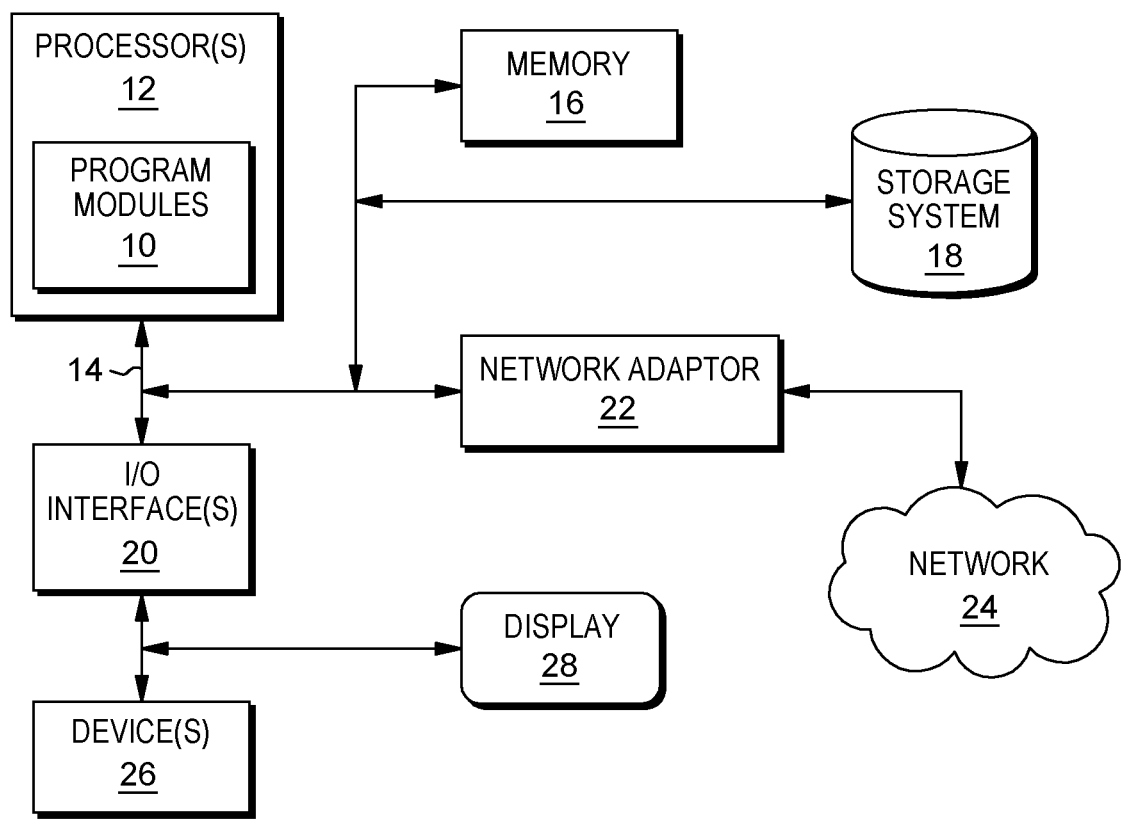
FIG. 6 illustrates an example computing system in accordance with an embodiment.

FIG. 6 illustrates an example computing system in accordance with the present invention that may provide the services and functions associated with flash-memory content access under power failure conditions. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the method described in FIG. 4.

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory an/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A persistent memory storage system comprising:
at least one memory storage device at a first computing system;
a memory controller for controlling input data and output data operations to and from said at least one memory storage device;
a network interface device operatively connected with said memory controller for communicating messages over a communications network;
a system for supplying power to said at least one memory storage device, said memory controller, and said network interface device upon detecting a power failure at said first computing system, wherein upon said power failure of said first computing system, said network interface device enabling a second computing system to access and extract data from said at least one memory storage device over a communications network, said power supplying system comprising:
a backup power source;
a multi-port Power over Ethernet (PoE) switch receiving power from said backup power source; and
a wired connection between a port of said PoE switch and a connector at said network interface device, said wired connection providing power to said at least one memory storage device, network interface device and said memory controller over a power distribution bus.

2. The persistent memory storage system of claim 1, wherein said second computing system accesses data stored in said memory storage system network interface device via communication signals according to a Transmission Control Protocol (TCP)/Internet Protocol (IP) protocol via said PoE switch, said signals from said second computing system configuring said memory controller to retrieve data stored in said at least one memory storage device.

3. The persistent memory storage system of claim 2, wherein said at least one memory storage system comprises one of: a dual-in-line memory module (DIMM) or a Peripheral Component Interconnect Express (PCIe) module, each DIMM or PCIe card housing a plurality of flash memory circuits, and a flash memory controller.

4. The persistent memory storage system of claim 3, wherein said second computing system comprises:
means for detecting a power failure at said first computing system, said second computing system responsively accessing data from said flash memory at one of said DIMM or PCIe module at a network address associated with said network interface device.

5. The persistent memory storage system of claim 1, further comprising
multiple computing devices each connected to respective port of said multiported PoE switch for receiving power from said backup power source, each multiple computing device having said at least one memory storage device storing data, and a memory controller;
said second computing system configured to:
access and retrieve data stored in said at least one memory storage device from said multiple computing devices via a connection to said PoE switch; and
transfer said retrieved data to another said one of said multiple computing devices via a respective connection to said PoE switch.

6. A persistent memory storage system comprising:
at least one memory storage device at a first computing system;
a memory controller for controlling input data and output data operations to and from said at least one memory storage device;
a serial data interface connection associated with said at least one memory storage device, said serial data interface connection configured for supplying power to said at least one memory storage device upon detecting a power failure at said first computing system,
said serial data interface physically connecting a second computer system and allowing access by said second computing system and extraction of data from said at least one memory storage device by said second computing system, said serial connection supplying power to said at least one memory storage device and memory controller over a power bus upon detecting a power failure at said first host computing system.

7. The persistent memory storage system of claim 6, further comprising:
a cable connection between said serial data interface connection associated with said at least one memory storage device and a corresponding physical serial data interface connection at said second computing system.

8. The persistent memory storage system of claim 7, wherein said at least one memory storage system comprises one of: a dual-in-line memory module (DIMM) or a Peripheral Component Interconnect Express (PCIe) module, each DIMM or PCIe card housing a plurality of flash memory circuits, and a flash memory controller.

9. The persistent memory storage system of claim 8, wherein said second computing system comprises:
means for detecting a power failure at said first computing system, said second computing system responsively accessing data from said flash memory at one of said DIMM or PCIe module via said serial data interface connection.

10. The persistent memory storage system of claim 6, wherein said serial data interface connection comprises a universal serial bus (USB) and connector interface.

11. The persistent memory storage system of claim 6, wherein said serial data interface connection comprises a Serial Advanced Technology Attachment (SATA) interface and connector.

12. A method of operating a persistent memory system comprising:
- detecting, at a second computing system, a power failure at a first computing system,
- said first computing system, said first computing system comprising:
  - at least one memory storage device at a first computing system;
  - a memory controller for controlling input data and output data operations to and from said at least one memory storage device; and
  - a network interface device associated with said memory storage device for communicating messages over a communications network;
  - said first computer system receiving power from a back-up power supply source over a connection to a port of a Power-over-Ethernet switch for powering said at least one memory storage device, said memory controller, and said network interface device;
- determining, at said second computing system, a network address location of said network interface device associated with said memory storage device of said first computing system; and
- extracting, by said second computing system, data stored at said at least one memory storage device of said first computing system; messages for receipt at said network interface device over a communications network via said PoE connection.

13. The method of claim 12, wherein said detecting a power failure comprises:
- sending, by said second computer system, a signal to said first computing system via said PoE switch and expecting receipt of a response signal, wherein a power failure is detected when said second computing device does not receive said response signal.

14. The method of claim 12, wherein said sending a signal comprises:
- periodically polling said first computing system via said PoE switch.

15. The method of claim 12, wherein said method comprises:
- detecting, at said first computing system, a power loss at said first computing system, and
- responsively activating a connection to said PoE switch for receiving power sufficient to enable access to said at least one memory storage device.

16. The method of claim 15, wherein said extracting stored data by said second computing system comprises: communicating signals according to a Transmission Control Protocol (TCP)/Internet Protocol (IP) protocol, said TCP/IP messaging from said second computing system, said signals configuring said memory controller to retrieve data stored in said at least one memory storage device for transmission to said second computing device.

17. The method of claim 12, wherein said persistent memory storage system comprises:
- multiple computing devices each connected to respective ports of said PoE switch for receiving power from said backup power source, each multiple computing device having said at least one memory storage device storing data, and a memory controller;
- said method further comprising:
  - accessing and retrieving, by said second computing system, data stored in said at least one memory storage device from said multiple computing devices via a respective connection to said PoE switch; and
  - storing, at said second computing system, data retrieved from said at least one memory storage device of said multiple computing devices.

18. The method of claim 17, further comprising:
- transferring, by said second computing system, said stored retrieved data to another said one of said multiple computing devices.

* * * * *